(12) United States Patent
Cakmakci et al.

(10) Patent No.: US 7,969,657 B2
(45) Date of Patent: Jun. 28, 2011

(54) IMAGING SYSTEMS FOR EYEGLASS-BASED DISPLAY DEVICES

(75) Inventors: Ozan Cakmakci, Orlando, FL (US); Jannick P. Rolland, Chuluota, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 12/257,757

(22) Filed: Oct. 24, 2008

(65) Prior Publication Data

US 2009/0180195 A1     Jul. 16, 2009

Related U.S. Application Data

(60) Provisional application No. 60/982,557, filed on Oct. 25, 2007, provisional application No. 60/986,776, filed on Nov. 9, 2007.

(51) Int. Cl.
*G02B 27/14*     (2006.01)

(52) U.S. Cl. ............................................ 359/631
(58) Field of Classification Search ............ 359/631
See application file for complete search history.

(56) References Cited

U.S. PATENT DOCUMENTS 6,023,372 A * 2/2000 Spitzer et al. ................ 359/630

* cited by examiner

*Primary Examiner* — Joseph Martinez
(74) *Attorney, Agent, or Firm* — Thomas, Kayden, Horstemeyer & Risley, LLP

(57) ABSTRACT

Disclosed are imaging systems and eyeglass-based display devices. In one embodiment, an imaging system includes an image source that generates images, a optical element that manipulates the images, and a beam splitter positioned between the image source and the optical element that reflects the images onto an eye of a user of the imaging system, wherein each of the image source, optical element, and beam splitter are aligned along the same optical axis.

16 Claims, 2 Drawing Sheets

IMAGING SYSTEMS FOR EYEGLASS-BASED DISPLAY DEVICES

CROSS-REFERENCE TO RELATED APPLICATIONS

This application claims priority to copending U.S. provisional application Ser. No. 60/982,557 entitled "Off-Axis Eyeglass Display Using a Single Optical Element Combined with an Image Source" and filed Oct. 25, 2007, and U.S. provisional application Ser. No. 60/986,776 entitled "On-Axis Eyeglass Display Using a Single Optical Element Combined with an Image Source" and filed Nov. 9, 2007.

BACKGROUND

The emergence of various technologies has given rise to a need for wearable displays. For example, virtual and augmented reality environments, wireless networks, miniaturization of electronic devices, and mobile computing devices, such as personal digital assistants (PDAs) and mobile telephones, have created a need for wearable displays with which device users can interface and, in at least some cases, carry with them as they move from place to place.

Head-worn displays, often referred to as head-mounted displays (HMDs), have existed for many years. Generally speaking, those HMDs have not been commercially adopted due to one or more of their size, bulk, complexity, or expense. Given the drawbacks of existing HMD designs, there is an interest in developing eyeglass-based display devices that have the general form factor of eyeglasses and that can be worn in similar manner to conventional eyeglasses or sunglasses. Such eyeglass-based display devices would be less obtrusive than previous HMDs and more portable.

There are several challenges to developing an eyeglass-based display device that is likely to be adopted by the public. Successful designs will combine relatively light weight, compactness, and desirable aesthetics. Although achieving a design that combines those attributes is itself difficult, even more difficult is providing those attributes while also delivering acceptable image quality.

BRIEF DESCRIPTION OF THE FIGURES

The components in the drawings are not necessarily to scale, emphasis instead being placed upon clearly illustrating the principles of the present disclosure. In the drawings, like reference numerals designate corresponding parts throughout the several views.

DETAILED DESCRIPTION

As described above, the emergence of various technologies has given rise to a need for wearable displays. Although head-mounted displays (HMDs) have existed for many years, those HMDs have not been broadly adopted due to various factors. Given the drawbacks of existing HMD designs, there is an interest in developing eyeglass-based display devices that have the general form factor of eyeglasses. Disclosed herein are on-axis imaging systems and eyeglass-based display devices that incorporate such imaging systems. Because the disclosed imaging systems have an on-axis configuration, manufacturing and testing becomes much simpler, thereby reducing costs.

Described in the following are embodiments of imaging systems and eyeglass-based display devices. Although particular embodiments are described, the disclosed systems and devices are not limited to those particular embodiments. Instead, the described embodiments are mere example implementations of the disclosed systems and devices.

Figure 1:
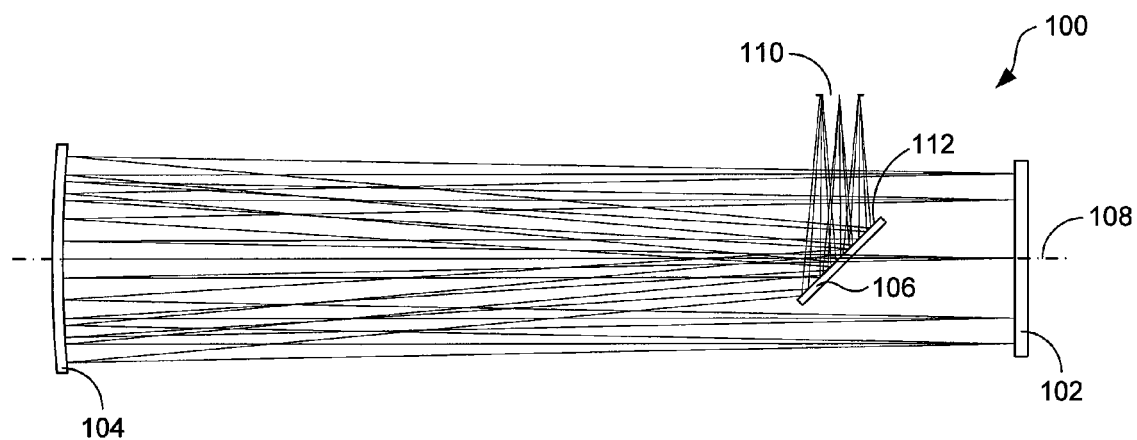
FIG. 1 is an embodiment of an imaging system designed for use in an eyeglass-based display device.

FIG. 1 illustrates an example on-axis imaging system 100. As used herein, and as will be appreciated from the discussion that follows, the term "on-axis" means that the elements of the system are aligned along the same optical axis. The imaging system 100 of FIG. 1 comprises an image source 102, an optical element 104, and a beam splitter 106. Each of those elements are aligned with each other along and are centered upon an optical axis 108. In some embodiments, the axis 108 is a horizontal axis to facilitate incorporation of the imaging system 100 into an eyeglass form factor.

As indicated in FIG. 1, the image source 102 is perpendicular to the optical axis 108. In some embodiments, the image source 102 comprises a microdisplay. Such a microdisplay can comprise any suitable small display technology. Examples of such technologies include a liquid crystal display (LCD), a liquid crystal on silicon (LCOS) display, a light emitting diode (LED) display, an organic light emitting diode (OLED) display, or another emissive, transmissive, or reflective display technology. By way of example, the image source 102 is rectangular and has a height dimension of approximately 3.5 millimeters (mm) and a length dimension of approximately 21 mm.

Given that it is the only component of the image system 100 that manipulates light from the image source (other than simply reflecting light), the optical element 104 comprises the only element of the image system with optical power. In the embodiment of FIG. 1, the optical element collimates light (images) from the image source 102 and reflects that light to the beam splitter 106. In some embodiments, the optical element 104 comprises a spherical mirror that is rotationally symmetric about the optical axis 108. By way of example, the optical element 104 is spaced approximately 10 centimeters (cm) to 12 (cm) from the image source 102 and has a radius of curvature of approximate 200 mm. In one embodiment, the optical element 104 is spaced 101.6 mm from the image source 102 and has a radius of curvature of 203.2 mm. In other embodiments, the optical element 104 can comprise an aspheric, free-form, or anamorphic surface to provide image correction or compensation.

The beam splitter 106 both transmits the light from the image source 102 to the optical element 104 and reflects light from the optical element on an entrance pupil 110, which may have a diameter of approximately 3 mm to 5 mm. In some embodiments, the beam splitter 106 comprises a partial mirror having a reflective inner surface 112. By way of example, beam splitter 106 is spaced approximately 15 mm to 20 mm (e.g., 17.5 mm) from the entrance pupil 110 and the inner surface 112 forms an angle of approximately 45 degrees with the optical axis 108. As illustrated in FIG. 1, the beam splitter 106 can be sized such that it does not extend across the entire width (vertical dimension in FIG. 1) of the image source 102, in which case only a portion of the light generated by the image source is transmitted by the beam splitter. In other embodiments, however, the beam splitter 106 can be larger such that it extends across the entire width of the image source 102, in which case more of the light generated by the image source (i.e., all the rays depicted in FIG. 1) is transmitted by the beam splitter.

Figure 2:
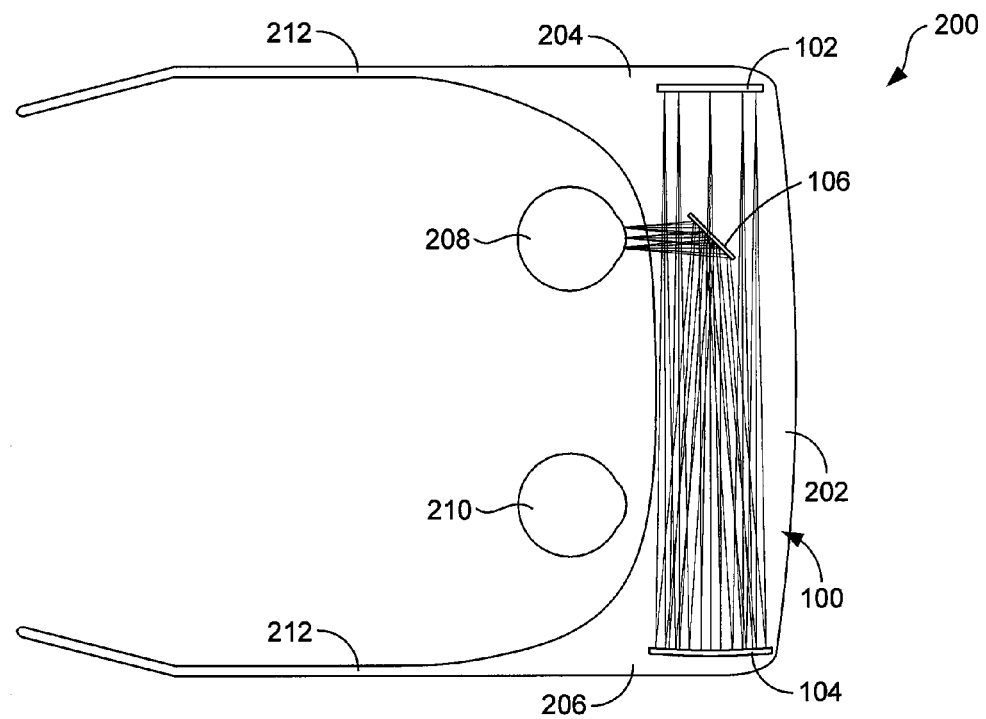
FIG. 2 is a top view of an eyeglass-based display device that incorporates an imaging system such as that illustrated in FIG. 1.

FIG. 2 schematically illustrates, in a top view (i.e., from the perspective of looking down from above) integration of the imaging system 100 into eyeglasses. Beginning with FIG. 2, illustrated is an eyeglass-based display device 200 having a monocular arrangement in which the imaging system 100 is incorporated into an eyeglass frame 202. Specifically, illustrated is an embodiment in which the image source 102 is incorporated into a left temple 204 of the frame, the optical element 104 is incorporated into a right temple 206 of the frame, and the beam splitter 106 is aligned with the eyeglass wearer's left eye 208. By way of example, the image source 102 is mounted to the left temple 204 and the optical element 104 is mounted to the right temple 206. In such an embodiment, images generated by the image source 102 can be focused on the wearer's left eye 208. In alternative embodiments, the configuration may be reversed. That is, the image source 102 can be incorporated into the right temple 206 of the frame 202, the optical element 104 can be incorporated into the left temple 204 of the frame, and the beam splitter 106 is aligned with the wearer's right eye 210 so that images generated by the image source can be focused on the wearer's right eye (i.e., the mirror image of the configuration of FIG. 2).

The eyeglass frame 202 further includes ear pieces 212 that extend rearward from the temples 204, 206 that are designed to rest on the wearer's ears in similar manner to conventional glasses. In some embodiments, the eyeglass frame 202 can comprise only a frame and exclude eyeglass lenses. Alternatively, the frame 202 can comprise integrated eyeglass lenses. In embodiments in which eyeglass lenses are not provided, the frame 202 can support the beam splitter 106 in front of one of the user's eyes 208, 210. In embodiments in which eyeglass lenses are provided, one of the lenses can comprise or support the beam splitter 106.

When the display device 200 is used, images generated by the image source 102 are transmitted by the beam splitter 106, reflected and manipulated (e.g., collimated) by the optical element 104, and reflected by the beam splitter to one of the user's eyes 208, 210. In some embodiments, a diagonal field of view of approximately 10.4 degrees is provided. Because of the configuration of the imaging system 100, which is limited to a single optical element having optical power and a beam splitter, chromatic aberration is negligible and, therefore, there is no need for color correction. Various types of images can be displayed to the wearer, including text, graphics, or photographic images.

Figure 3:
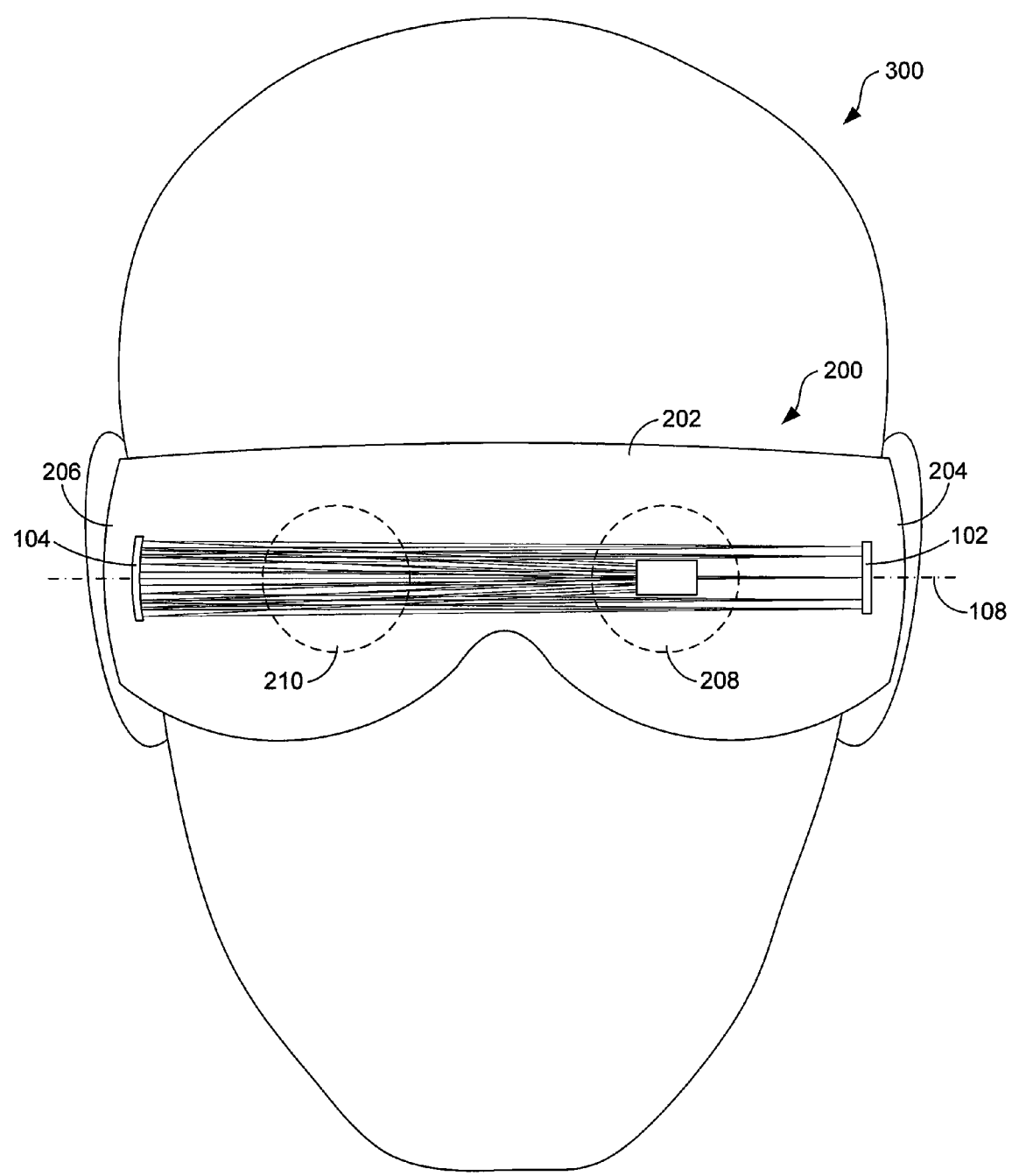
FIG. 3 is front view of the eyeglass-based display device of FIG. 2 as worn by a user.

FIG. 3 illustrates the eyeglass-based display device 200 as worn on the head 300 of a user or wearer. As is apparent from FIG. 3, the optical axis 108 of the image system 100 is generally horizontal when the display device 200 is worn and the head 300 is upright and extends from temple to temple of the wearer.

As stated above, while particular embodiments have been described in this disclosure, alternative embodiments are possible. Furthermore, it is noted that although the disclosed imaging systems are described as being integrated into "eyeglasses," it is to be understood that it is not intended to limit application of the imaging systems to existing eyeglass designs. Instead, eyeglasses may be specially designed to support the disclosed imaging systems. Moreover, although the terms "eyeglasses" and "eyeglass-based" are used, it is to be understood that those terms are not intended to limit the application of the imaging systems to conventional eyeglasses. Instead, applicant is generally referring to apparatus that can be worn on the head and/or face in similar manner to eyeglasses and project images to one or more of the wearer's eyes, regardless of the particular configuration of the apparatus.

The invention claimed is:

1. An imaging system comprising:
    an optical axis;
    a microdisplay centered on the optical axis that generates images;
    a spherical mirror that is rotationally symmetric about the optical axis that collimates the images; and
    a partial mirror beam splitter centered on the optical axis and positioned between the image source and the optical element that reflects the collimated images onto an eye of a user of the imaging system.

2. The imaging system of claim 1, wherein the spherical mirror is spaced approximately 10 cm to 12 cm from the microdisplay.

3. The imaging system of claim 1, wherein the spherical mirror is the only element of the imaging system that has optical power.

4. The imaging system of claim 1, wherein the imaging system comprises no elements beyond the microdisplay, the spherical mirror, and the beam splitter.

5. An eyeglass-based display device comprising:
    an eyeglass frame having opposed first and second temples; and
    an imaging system integrated into the eyeglass frame, the imaging system including an image source integrated into the first temple that generates images, a optical element integrated into the second temple that manipulates the images, and a beam splitter positioned between the image source and the optical element that reflects the images onto an eye of a user of the display device, wherein each of the image source, optical element, and beam splitter are aligned along the same optical axis.

6. The display device of claim 5, wherein the image source is a microdisplay.

7. The display device of claim 5, wherein the optical element is a spherical mirror.

8. The display device of claim 7, wherein the spherical mirror is rotationally symmetric about the optical axis.

9. The display device of claim 5, wherein the beam splitter comprises a partial mirror that transmits the images generated by the image source and reflects the images manipulated by the optical element.

10. The display device of claim 5, wherein the optical element is spaced approximately 10 cm to 12 cm from the image source.

11. The display device of claim 5, wherein each of the image source, optical element, and beam splitter are centered on the optical axis.

12. The display device of claim 5, wherein the optical element is the only element of the imaging system that has optical power.

13. An eyeglass-based display device comprising:
    an eyeglass frame including opposed temples; and
    an imaging system integrated into the eyeglass frame, the imaging system including an optical axis, a microdisplay centered on the optical axis and mounted to a first eyeglass frame temple that generates images, a spherical mirror that is rotationally symmetric about the optical axis and mounted to a second eyeglass frame temple that collimates the images, and a partial mirror beam splitter centered on the optical axis and positioned between the image source and the optical element that reflects the collimated images onto an eye of a user of the display device.

14. The display device of claim 13, wherein the spherical mirror is spaced approximately 10 cm to 12 cm from the microdisplay.

15. The display device of claim 13, wherein the spherical mirror is the only element of the imaging system that has optical power.

16. The display device of claim 13, wherein the imaging system comprises no elements beyond the microdisplay, the spherical mirror, and the beam splitter.

* * * * *